F. E. POINDEXTER.
DIRIGIBLE HEADLIGHT FOR VEHICLES.
APPLICATION FILED JUNE 18, 1919. RENEWED JUNE 24, 1920.
1,360,791.
Patented Nov. 30, 1920.
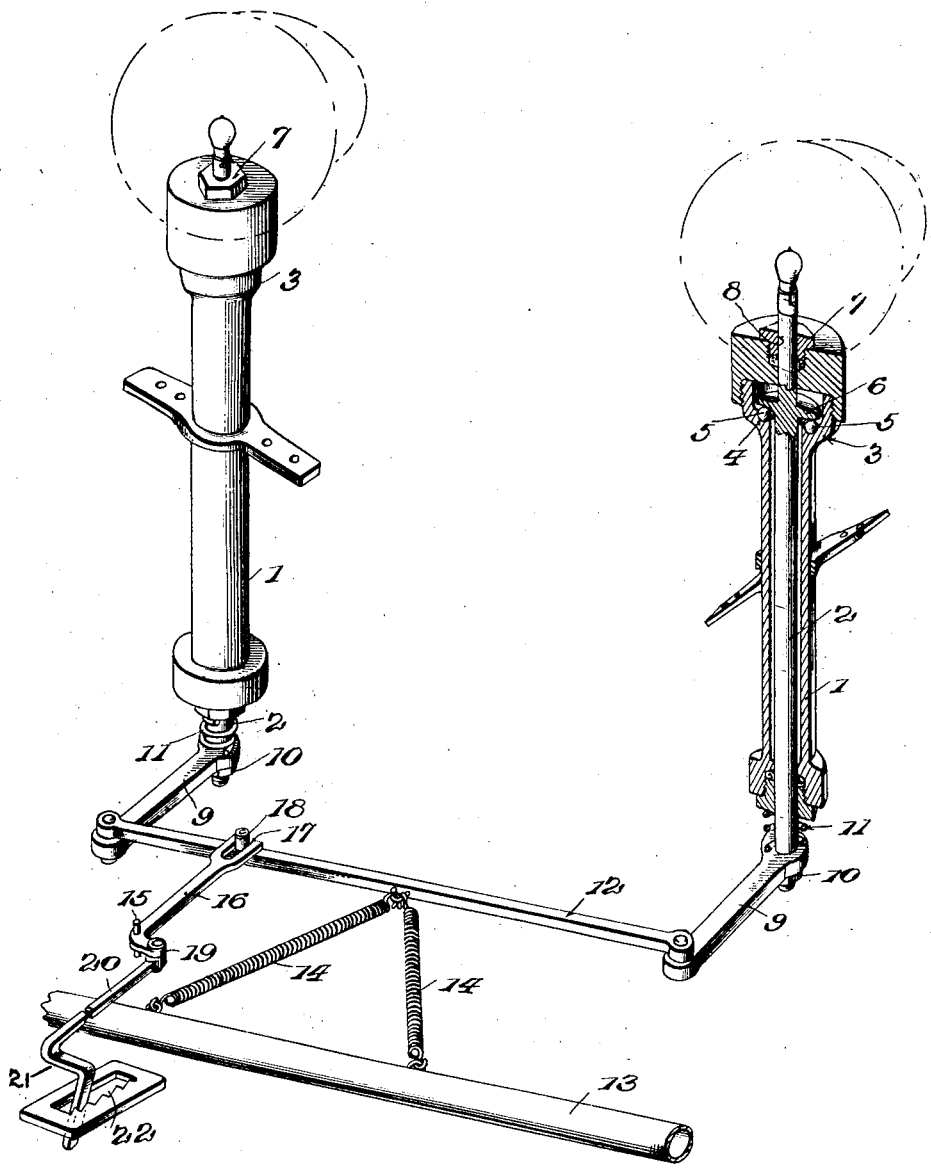
Inventor
Franklin E. Poindexter.
by,
Attorney.

UNITED STATES PATENT OFFICE.

FRANKLIN E. POINDEXTER, OF DENTON, TEXAS.

DIRIGIBLE HEADLIGHT FOR VEHICLES.

1,360,791.  Specification of Letters Patent.  Patented Nov. 30, 1920.

Application filed June 18, 1919, Serial No. 305,084. Renewed June 24, 1920. Serial No. 391,550.

*To all whom it may concern:*

Be it known that I, FRANKLIN E. POINDEXTER, a citizen of the United States, residing at 152 W. Mulberry street, Denton, in the county of Denton and State of Texas, have invented certain new and useful Improvements in Dirigible Headlights for Vehicles, of which the following is a specification.

This invention relates to an improvement in dirigible headlights for vehicles, and comprehends a structure wherein the headlights are adapted to turn with the steering of the vehicle, or may be manually deflected independently of the vehicle steering.

The improved headlights are mounted for rotative movement in hollow standards carried by appropriate parts of the vehicle, and connected for simultaneous movement by a rod. Such rod is connected by spring elements with the usual steering bar of the vehicle, so that the headlights will follow the action of such steering bar in the steering operation of the vehicle. The rod is also adapted for operation through a foot-controlled mechanism, whereby the driver may control the direction of the headlights independently of the steering operation.

In the drawings:—

The figure is a perspective view, partly in section, illustrating the improved dirigible headlights.

The improved headlight mountings are of course in duplicate, and comprise hollow standards 1, secured by any usual or preferred means to appropriate parts of the vehicle. Supporting rods 2, pass rotatably through the standards, and the latter are enlarged at their upper ends as at 3, and shaped at the lower ends of such enlargements to provide ball cups 4, to receive anti-friction balls 5. The rods 2 are formed with cones 6 to coöperate with said balls 5, to properly support the rods. The enlargements 3, above the ball bearings provide oil receptacles for the lubrication of the bearings, and such are closed by nut-caps 7, having openings 8 through which the rods 2 pass, suitable packing glands sealing the openings.

The headlights are fixed in any suitable manner upon the upper ends of the rods 2, so as to move with such rods in operation.

The lower ends of the rods 2, extend below the standards 1, the opening being protected by packing and glands, and below the standards, such rods 2 are provided with arms 9, which extend at approximately right angles to the rods 2. The arms are secured to the rods by threaded connection, and further held by lock nuts 10. Springs 11 are arranged between the arms 9 and the lower ends of the standards 1, said springs encircling the rods 2, and holding the rods under sufficient tension to prevent rattling of the parts under movement of the vehicle.

The free ends of the arms 9 are connected by a tie bar 12, so that said arms, and therefore the headlight-supporting rods 2, are compelled to move in unison. The tie rod is connected to the steering rod 13 of the vehicle by coil springs 14, which springs are connected at one point on the tie rod, and to spaced points on opposite sides of the center of the steering rod, as shown. By this means any movement of the steering rod is imparted to the tie rod through the springs, while and of more importance, any independent movement of the body and chassis is taken up by the springs 14, and breakage prevented.

The construction so far described insures that any steering movement of the vehicle will result in a corresponding turning movement of the headlights, the latter following the direction of the wheels to always maintain the light projection in the direction of travel.

The invention also contemplates, however, a manual control of such headlights, so that the driver may turn the lights independently of the steering operation. This is frequently of advantage in inspecting the side of the road, or in turning the lights to avoid interfering with the vision of an approaching driver. For this purpose, a stud 15, is secured to an appropriate part of the vehicle and depends therefrom. An L-shaped lever 16 is pivotally supported on such stud, and has its forwardly-projecting arm longitudinally slotted, as at 17 to embrace a projection 18 on the tie rod. This projection is preferably in the form of a roller to reduce friction. The short arm of the lever 16 is provided with a stud 19 on which is mounted one end of a bar 20, extending to the floor board of the vehicle. At the inner end the bar 20 is connected with a foot-piece 21, which extends through the floor board of the vehicle within convenient reach of the driver. The plate protecting the opening through which the foot-piece extends has a locking edge 22, and the foot-piece has a series of teeth to coöperate with such edge, whereby the foot-piece may be locked in any desired position to hold the lights turned to the extent desired.

The operator may thus turn the headlights as desired independently of the steering operation, and such steering operation may be readily effected without interference from such manually turned lights, as the springs 14 will yield to permit the necessary movement.

Having thus described the invention, what is claimed as new, is:—

1. A vehicle, headlights therefor secured on rods, hollow standards in which said rods are mounted, ball-bearings between said standards and rods, the standards being extended above the ball bearings forming oil chambers, caps carried by said standards for closing said chambers, arms secured on the lower ends of the rods, and springs encircling the rods and bearing between the standards and arms to prevent endwise play of the rods in the standards.

2. In a vehicle, headlight-supporting rods rotatably mounted on the vehicle, arms secured to the lower ends of said rods, a tie rod connecting said arms, a roller stop on the tie rod, spring connectors between the tie rod and the steering bar of the vehicle, a lever mounted on the vehicle having a forked arm to embrace the roller stop, and a foot-piece connected to and adapted for operating said lever, whereby the headlights may be turned by operation of the foot-piece independently of the movement of the steering bar.

In testimony whereof I affix my signature.

FRANKLIN E. POINDEXTER.